Oct. 5, 1954   R. A. MELDRUM   2,690,719
TRAP DOOR AND STEP ASSEMBLY
Filed June 8, 1951   5 Sheets-Sheet 1

Inventor:
Robert A. Meldrum
By: Zabel & Gritzbaugh
Attorneys

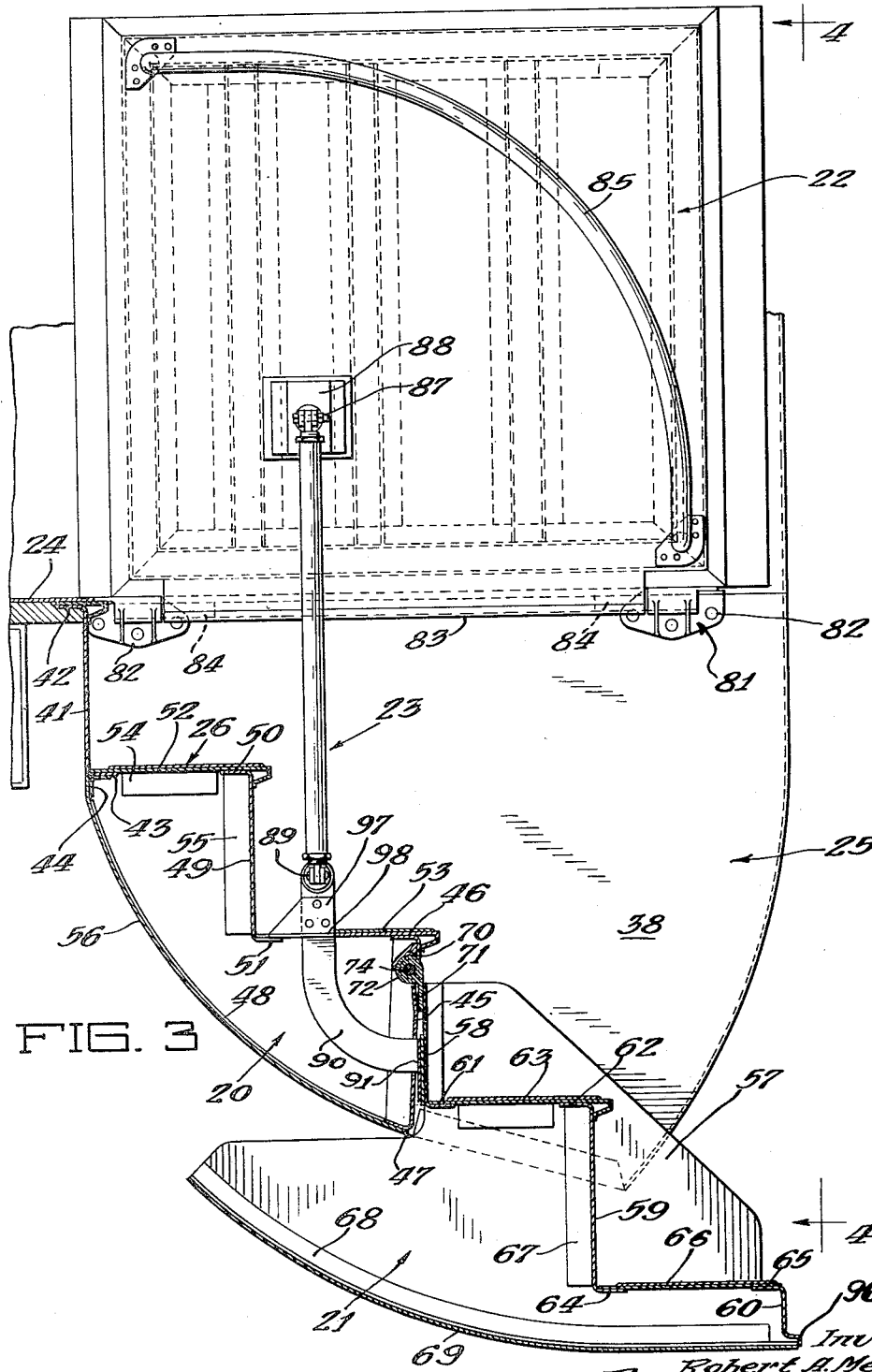

Oct. 5, 1954 R. A. MELDRUM 2,690,719
TRAP DOOR AND STEP ASSEMBLY
Filed June 8, 1951 5 Sheets-Sheet 3
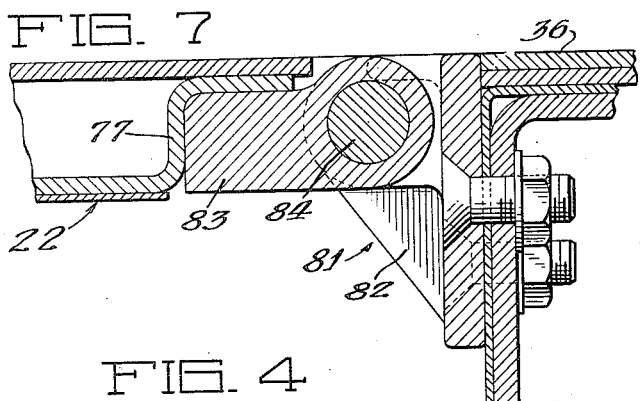
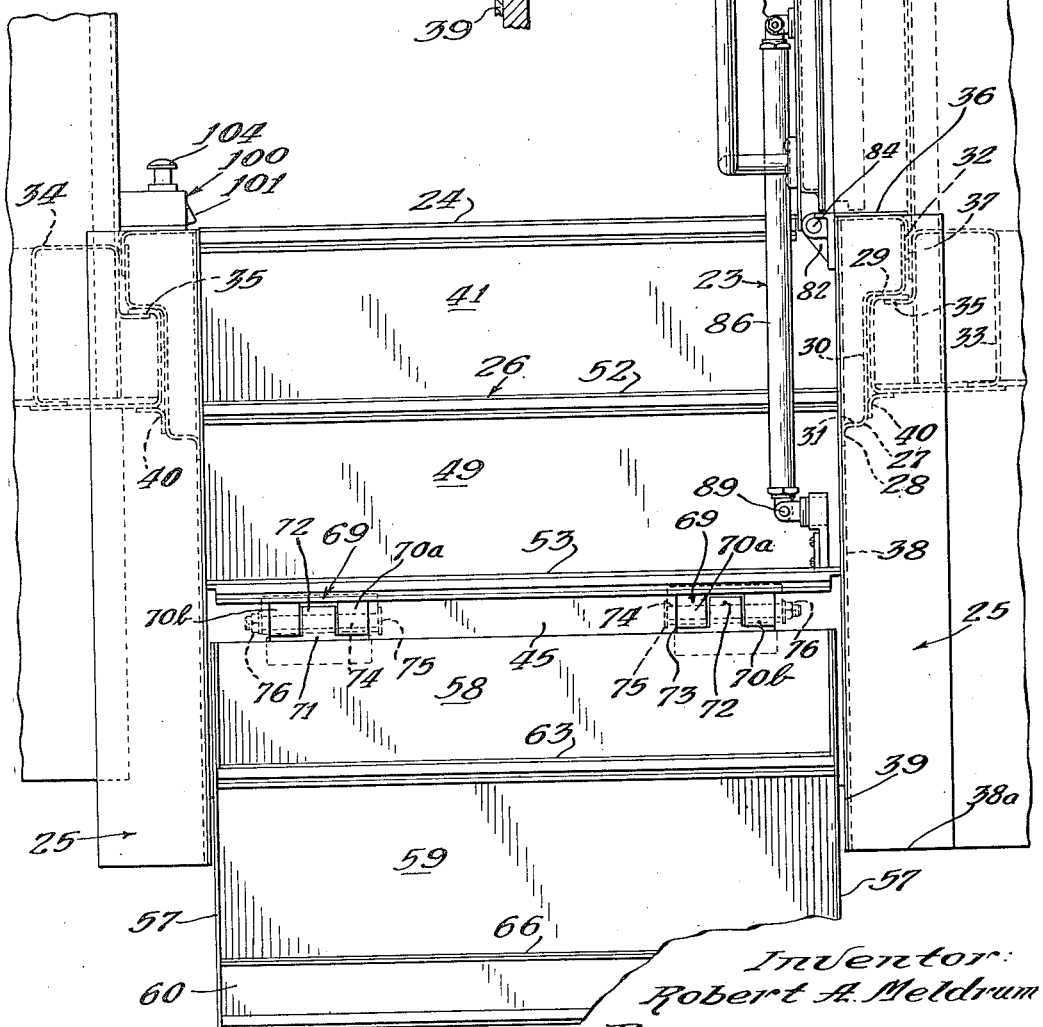
Inventor:
Robert A. Meldrum
By Zahl & Gutbaugh
Attorneys Oct. 5, 1954    R. A. MELDRUM    2,690,719
TRAP DOOR AND STEP ASSEMBLY
Filed June 8, 1951    5 Sheets-Sheet 4

Inventor:
Robert A. Meldrum
By: Zabel & Gitzbaugh
Attorneys

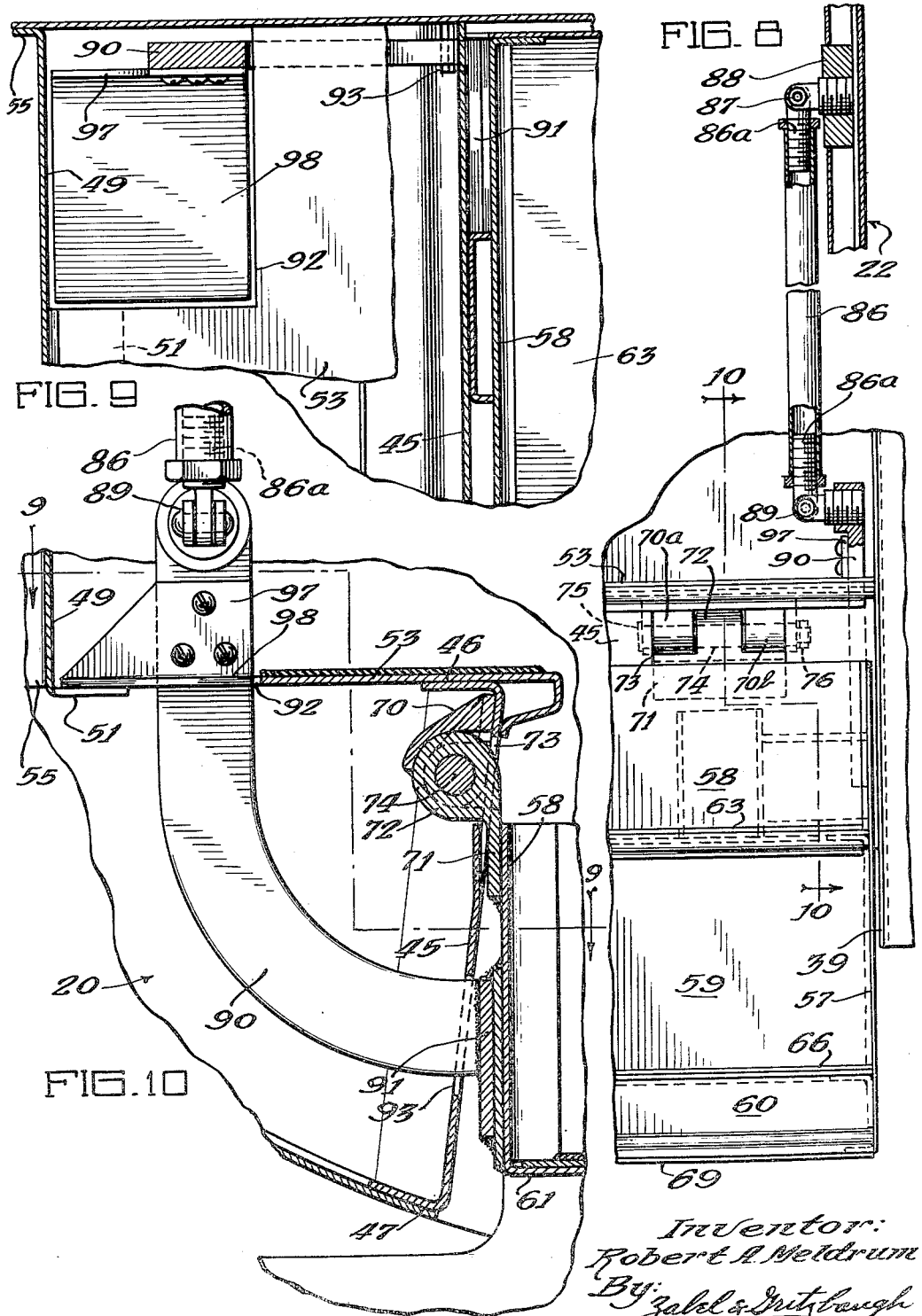

Patented Oct. 5, 1954

2,690,719

UNITED STATES PATENT OFFICE 2,690,719

TRAP DOOR AND STEP ASSEMBLY

Robert A. Meldrum, Chicago, Ill., assignor to Pullman-Standard Car Manufacturing Company, Chicago, Ill., a corporation of Delaware Application June 8, 1951, Serial No. 230,674

8 Claims. (Cl. 105—430)

The present invention relates to a step and trap door assembly for the vestibule end of a railway passenger car or like vehicle. In particular, the invention contemplates the provision of a prefabricated step and trap door unit that can be mass produced and then installed as a unit on the car.

An object of the invention is to provide such a step and trap door assembly that can be manufactured for a minimum of cost and can be installed readily in a minimum of time.

A step embodying the present invention is of the folding type that has at least a portion thereof that moves from an open position when the trap door is open, to a closed position when the trap door is in its lowered or closed position. The step or at least a portion thereof is mounted on hinges that are entirely enclosed within a housing when the step is closed, thereby providing protection for the hinges from weather as well as from dirt and sand that is always thrown up from the road-bed as the car is travelling.

The trap door is mechanically connected to the movable portion of the step so as to move the step between open and closed positions when the trap door is moved between open and closed positions. The mechanism connecting these two elements together is also enclosed and protected, both from the weather and from the road-bed dirt, during the time the trap door is closed and the car is in motion.

All of the foregoing constitute some of the principal objects and advantages of the present invention, others of which will become apparent from the following description and the drawings, in which Fig. 1 is a somewhat diagrammatic side elevational view of a railroad passenger car illustrating a vestibule end that accommodates a step and trap door arrangement that embodies the present invention;

Fig. 3 is a view corresponding to Fig. 2 but illustrating the step and trap door in their open position for use in allowing ingress into the car;

Fig. 4 is a front elevational view of the step and trap door with a fragment of the car illustrated, the view being taken in the direction of the arrows 4—4 of Fig. 3 and showing the step and trap door in their open position corresponding to the showing of Fig. 3;

Fig. 7 is an enlarged, fragmentary, sectional view taken along the line 7—7 of Fig. 5 and illustrating one end of the hinge mechanism for the trap door;

Fig. 8 is an enlarged, fragmentary, front elevational view of the step and trap door, showing both the step and trap door in open position, portions of the trap door and connecting mechanism being broken away and illustrated in section;

Fig. 9 is a fragmentary, horizontal, sectional view through the step, the view being taken along the line 9—9 of Fig. 10 and illustrating the open position of the step and operating mechanism that connects the step with the trap door; and Fig. 10 is an enlarged, vertical section through a fragment of the step, the view being taken along the line 10—10 of Fig. 8 and showing a fragment of the mechanism that connects the trap door and step in the position corresponding to the step and trap door open positions.

For purposes of illustration a single embodiment of the present invention has been selected and will be described hereinafter. It is recognized, of course, that numerous modifications may occur to the man skilled in the art and it is intended that such modifications can be made in the illustrated embodiment without departing from the spirit and scope of the invention.

Figure 1:
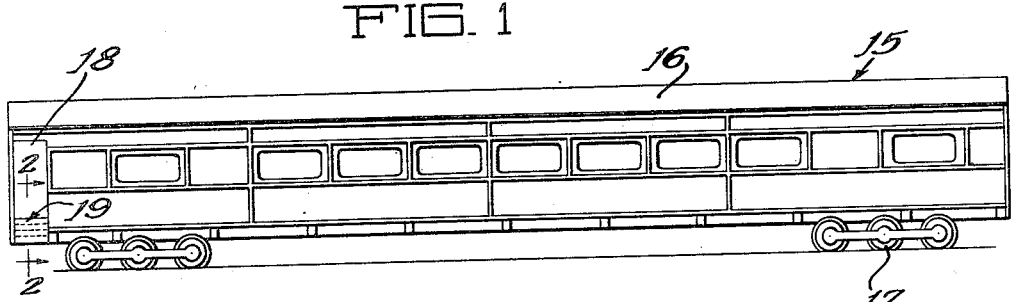

Referring now to the drawings and particularly to Fig. 1, the invention is illustrated as applied to a railroad car generally indicated at 15 that includes a car body 16 mounted on wheeled trucks 17. The car 15 is a passenger car that may have one or more vestibule entrances, one of which is illustrated at 18. The present invention concerns the step and trap door assembly that is generally indicated at 19 in Fig. 1 and that is mounted in the vestibule doorway that is indicated at 18.

Referring now to Figs. 2 to 5 inclusive, the step and trap door assembly that is generally indicated at 19 comprises generally three major subassemblies that may be identified as the stationary step and step-well assembly generally indicated at 20, the movable step assembly indicated generally at 21 and the trap door assembly indicated generally at 22. The movable step assembly 21 is operatively connected to the trap door assembly 22 by means of a connecting mechanism generally indicated at 23.

Before discussing in detail the structures of each of these major sub-assemblies, a general description of the function and operation of the entire assembly 19 may be helpful. In the vestibule end of a railway passenger car 15 there is usually a platform along the center line of the car that forms a continuation of the car floor. On each side of this platform and adjacent the door openings 18 there is a step-well into which there is normally provided steps extending from the vestibule platform to a position above the ground on the outside of the car. This provides means for gaining access from the ground to the vestibule platform and hence into the car body. There is also conventionally provided a trap door that normally covers the well over the steps and is disposed at the same level as the vestibule platform so as to form a continuation of the vestibule platform all the way to the side wall of the car. This trap door is usually hinged and can be moved between this closed position where the step-well is covered, to an open position against the end wall of the car. It has been conventional practice to provide stationary steps below the trap door and there are many instances where folding or movable steps have been provided. In the equipment where the folding steps have been utilized, it has often been customary to connect the trap door and the movable step so that the step can be moved between open and closed positions by movement of the trap door between its open and closed positions.

In the past, step and trap door assemblies of this latter type have required approximately fifty-two hours to apply to a car. It has been found with the present invention that only two hours are required to apply the steps and trap door to the car and there has been a great saving in time in the overall fabrication of the step and trap door.

Figure 2:
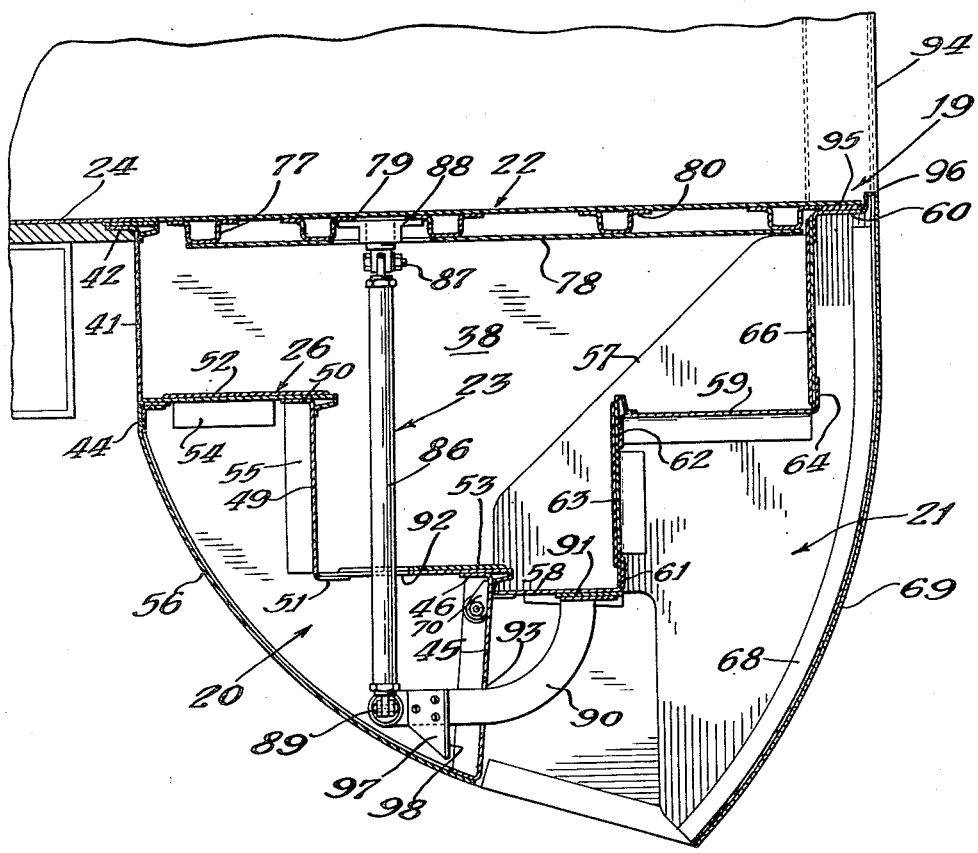
Fig. 2 is an enlarged, vertical, sectional view taken through the step and trap door, the view being taken along line 2—2 of Fig. 1 and illustrating the step and trap door in their closed position.

Referring to Figs. 2, 3 and 4, it will be noted that the movable or folding step assembly 21 can be disposed in a closed position illustrated in Fig. 2, or an open position illustrated in Figs. 3 and 4. When the movable step assembly 21 is closed, the trap door assembly 22 is in its closed position (see Fig. 2), spanning the steps over the step-well and in alignment with the vestibule platform indicated at 24. When the trap door assembly 22 is in its open position illustrated in Figs. 3 and 4, the folding step assembly 21 is likewise in its open position.

The stationary step-well assembly 20 is best shown in Figs. 2 to 5 inclusive and includes a pair of spaced apart well side units generally indicated at 25, connected together by stationary steps generally indicated at 26. Each of the well side units comprises a supporting frame member 27 (see Figs. 4 and 5) that has a lower connecting flange 28 and an upper shoulder portion 29. Between the lower connecting flange 28 and the upper shoulder portion 29 is a downwardly projecting web portion 30 and a horizontally disposed portion 31. Above the shoulder portion 29 is an upstanding connecting flange 32.

It is conventional practice to provide a car body end sill indicated at 33 in Fig. 4 and a buffer wing or sill 34 between which car framing members the step well is located. In the present instance the body end sill 33 and the buffer wing 34 are each provided with a shoulder portion indicated at 35, upon which the shoulder portion 29 of the adjacent supporting frame member 27 for the step well is mounted.

An angle plate 36 is provided at the top of the supporting member 27 and is fastened to the upstanding connecting flange 32 of the supporting member 27 by means of a downwardly disposed flange 37. A plate 38 is secured to the other edge of this member 36 and to the lower connecting flange 28 and member 27 and extends the full height and width of the well side unit 25. This plate 38 has a lower horizontally disposed flange 38a that forms the lowermost framing portion of the well unit 25. A finish sheathing 39 is applied to the inner face of the plate 38. An angle bracket 40 secures the supporting member 27 to the lower portion of the body end sill 33 or the buffer wing 34, as the case may be.

Referring now to Figs. 2 to 4 inclusive, the stationary steps 26 include an upper riser 41 that extends between and is secured to the spaced apart well units 25. This upper riser 41 is flanged at the top as indicated at 42 so that it can be secured to the vestibule platform 24. At the lower end the riser 41 is flanged outwardly at 43. An angle frame member 44 is disposed horizontally and is secured to the spaced apart well units 25 and the lower flange 43 of the upper riser 41 is properly secured to this angle frame member 44. A lower riser 45 of the stationary steps 26 extends between and is secured to the spaced apart well units 25 and is provided at its upper end with an inturned flange 46 and at its lower end with an inturned flange 47. Between the inturned flange 47 and the angle framing member 44 are suitable step framing members, one of which is indicated at 48. An intermediate stationary step riser 49 is disposed between and secured to the well units 25, and this riser is likewise provided with upper and lower flanges 50 and 51, respectively. Upper and lower treads 52 and 53, respectively, for the stationary steps 26 are provided and these are mounted on the flanges 43, 50 and 51, 46 respectively, of the appropriate risers. These tread plates are provided with suitable flanges 54 at their opposite ends for attachment to the spaced apart well units 25. Similarly the risers 41, 45 and 49 are provided with suitable flanges 55 for fastening to the spaced apart well units 25. A closing sheet 56 closes the back of the stationary steps 26 and extends from the angle framing member 44 to the lower inturned flange 47 of the lower riser 45.

The movable or folding step assembly 21 comprises a pair of spaced apart side walls 57 (see Figs. 2 to 4 inclusive), between which are disposed and mounted upper, intermediate and lower step risers 58, 59 and 60 respectively. The upper riser 58 is provided with an inturned flange 61 and the intermediate riser 59 is provided with an upper flange 62, between and mounted upon which flanges 61 and 62 is an upper tread plate 63. Similarly the intermediate riser 59 is provided with a lower flange 64 and the lower riser 60 is provided with an upper flange 65, between and upon which last mentioned flanges is mounted a lower tread plate 66. Suitable flanges 67 are again provided for securing these various risers and tread plates to the side walls 57 of the folding step assembly 21.

Suitable angle framing members 68 are mounted along the lower edges of the side walls 57 of the folding step assembly 21 and to these angle members 68 is secured a closing sheet or sheathing 69 that forms the front wall of the folding step assembly 21 when it is disposed in its closed position shown in Fig. 2, or the underneath wall when the step assembly 21 is disposed in its open position shown in Fig. 3.

Referring now to Figs. 2, 3 and 4, and particularly Fig. 4, the folding step assembly 21 is pivotally attached to the stationary step assembly 20 by means of a pair of spaced apart hinges generally indicated at 69. Each hinge comprises a hinge bracket 70 that is mounted on the inner face of the lower riser 45 of the stationary step assembly 20. This bracket 70 includes bifurcated members 70a and 70b shown in Fig. 4. Mounted on the upper riser 58 of the folding step assembly 21 is a complementary hinge bracket 71 that includes a projection 72 that is adapted to project through an aperture 73 in the lower riser 45 of the stationary step assembly and between the bifurcated members 70a and 70b of the hinge bracket 70. A pin 74 passes through aligned apertures in the bifurcated members 70a and 70b and the projecting portion 72. This pin 74 may be provided with a head 75 at one end and threaded on the other end to receive a nut 76. As best shown in Figs. 3 and 4, both of the hinges 69 are entirely enclosed within a housing formed by the various risers, tread plates and the closing sheet 56 of the stationary step assembly 20. The folding step assembly 21 then can pivot between its closed and open positions about pins 74.

Figure 5:
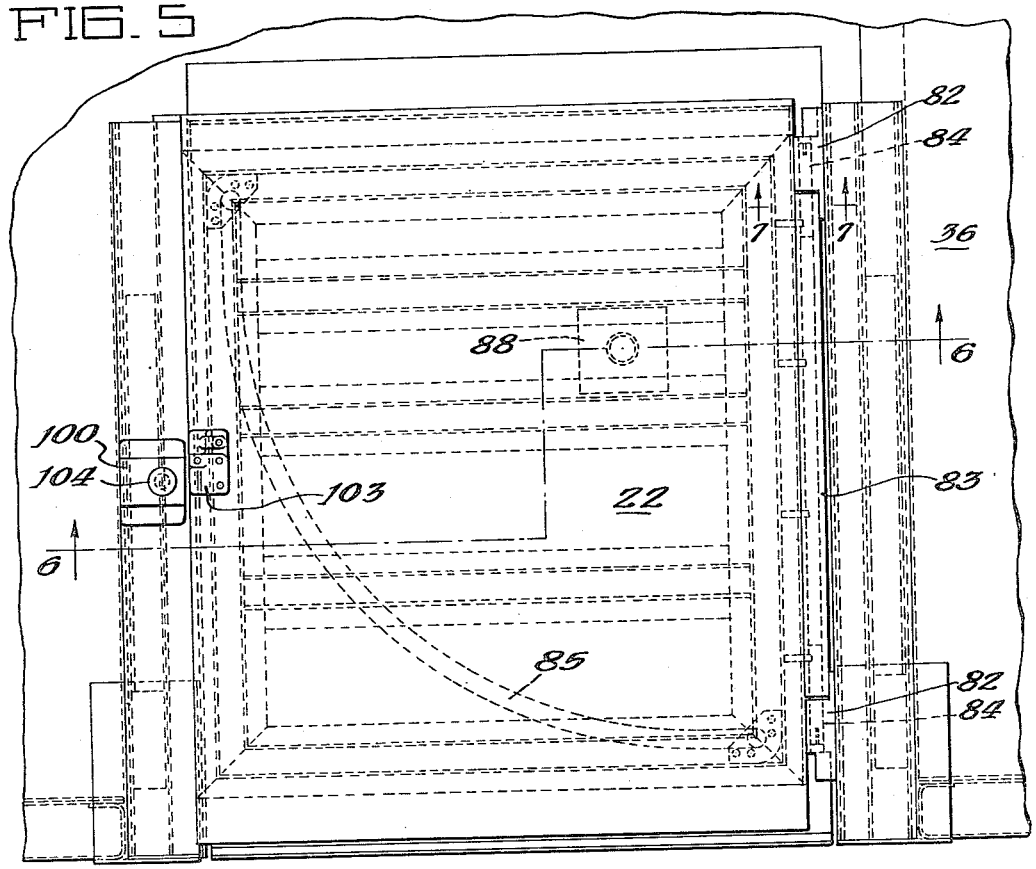
Fig. 5 is a plan view of the step and trap door taken from above the trap door, the view showing the step and trap door in their closed position.

The third sub-assembly making up the entire step and trap door assembly is the trap door sub-assembly 22 best shown in Figs. 2 to 5 inclusive. Referring particularly to Fig. 2, the trap door sub-assembly 22 includes a plurality of parallel channel members 77 that are spaced apart and extend substantially throughout the entire width of the trap door. A bottom plate 78 is secured to the underneath faces of all of the channel members 77 and a top plate 79 is secured to the opposite faces of all of the channel members 77. Suitable flanges 80 are provided on the channel members for attachment to the upper or floor plate 79 of the trap door. As shown in Figs. 2 and 5, the top or floor plate 79 projects over and rests upon the surfaces of the step and well that are disposed directly beneath the trap door when the latter is in its closed position.

Figure 6:
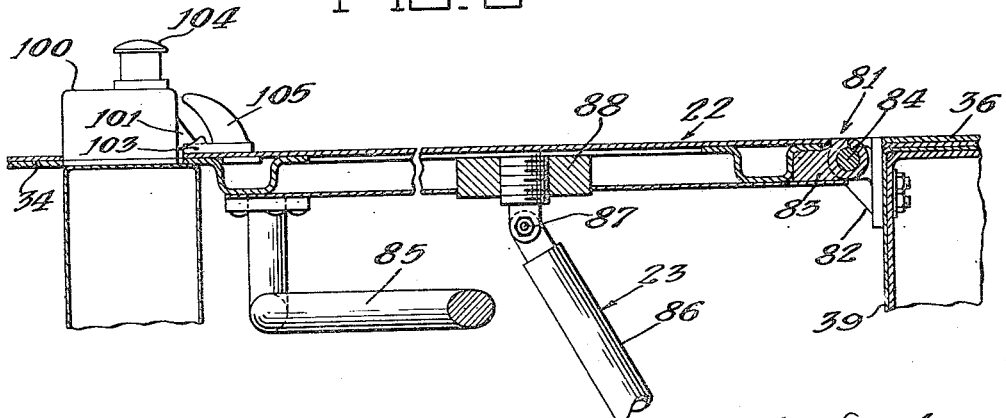
Fig. 6 is an enlarged, vertical, sectional view taken through the trap door, the view being taken along the line 6—6 of Fig. 5 and illustrating fragments of the step-well and operating mechanism disposed below the trap door.

A suitable hinge generally indicated at 81 (see Figs. 3, 5 and 6) is provided for securing the trap door assembly 22 to the step and well assemblies. This hinge 81 includes a pair of spaced apart hinge brackets 82 (see Figs. 3 and 5) that are suitably secured to one of the spaced apart well units 25. Disposed between these spaced apart hinge brackets 82 is a cooperating hinge member 83 that is suitably fastened to the trap door and passing through aligned apertures in this cooperating hinge member 83 and the spaced apart hinge brackets 82 are pins 84, about which the trap door pivots. As shown in Figs. 3 and 4 a hand rail 85 may be mounted on the underneath face of the trap door to provide a support that can be grasped by passengers as they are boarding or leaving the car.

As previously mentioned, a connecting mechanism generally indicated at 23 in Figs. 2 and 3, operatively connects the trap door assembly 22 to the folding step assembly 21 so that as the trap door is opened, the folding step is similarly moved to its open position and conversely as the trap door is closed, the folding step assembly is moved to its closed position. This connecting mechanism 23 includes a connecting or operating rod 86 that is pivotally connected at its upper end as at 87 to a bracket 88 that is secured to the bottom of the trap door assembly 22. At the lower end the connecting rod 86 is pivotally secured as at 89 to one end of a curved arm 90, the latter of which is secured at its other end as at 91 to the rear face of the upper riser 58 of the folding step assembly 21.

An aperture 92 is provided in the lower tread plate 53 of the stationary step assembly 20 to accommodate the connecting rod 86 that passes vertically through the aperture. Similarly an aperture 93 is provided in the lower vertical riser 45 of the stationary step assembly 20 to accommodate the curved arm 90 that passes through this latter aperture.

When the trap door assembly 22 is in its closed position shown in Fig. 2, the folding step assembly 21 is closed so that the sheathing or closing sheet 69 forms in effect a skirt or continuation of the outer car wall sheathing indicated at 94 in Fig. 2. When in this closed position the lowermost riser 60 of the folding step assembly 21 is disposed beneath the upper or floor plate 79 of the trap door assembly 22 and a rubber pad or filler block 95 is disposed between this riser 60 and the upper plate 79. An arcuate flange 96 is disposed at the lower or outermost end of this last mentioned step riser 60 and this flange as viewed in Fig. 2 projects upwardly so as to serve as a weather protecting wall at the outer edge of the trap door.

When the trap door is moved to its open position shown in Fig. 3, the connecting rod 23 pulls the curved arm 90 from the position shown in Fig. 2 to the position shown in Fig. 3, moving with it the folding step assembly 21 so that the latter now assumes its open position shown in Fig. 3. Mounted on the curved arm 90 is a closure plate 97, which when in the position shown in Fig. 3, is disposed with its closure flange 98 in alignment with the step tread 53. This closure flange 98 is of suitable shape and size to effectively close the aperture 92 in the step tread 53, but when the trap door is moved toward its closed position, this closure plate 97 moves away from the aperture 92 and ultimately assumes the position illustrated in Fig. 2 when the trap door and folding step assemblies 22 and 21 respectively, are fully closed.

It is significant to note that when the trap door and step are in their closed positions illustrated in Fig. 2 all of the connecting mechanism 23 is fully enclosed within a housing formed by the various step tread plates, risers and closing sheets so that all of the connecting mechanism together with the various hinges previously described are fully protected from the weather and from the dirt that is normally thrown up from the road-bed while the car is in motion.

Mounted on the top face of the step well unit 25 that is disposed opposite the trap door hinge is a hold-down latch 100 (see Figs. 4, 5 and 6) for the trap door assembly 22. This latch has a keeper 101 that is spring-biased in an extended position shown in Figs. 4 and 6. On the adjacent edge of the trap door is a cooperating bracket 102 that has a lug 103 adapted to cooperate with the latch 100. When the trap door is closed keeper 101 engages lug 103 and holds the trap door closed. To release the trap door, pressure on a foot button 104 withdraws the keeper 101.

The folding step and trap door are balanced so that when released the step drops by gravity to pull the trap door to a partially open position, say about half way open. The operator then pushes the trap door to its fully open position, thereby also lowering the folding step to its fully open position.

Mounted on the end wall of the car is a latch (not shown) for securing the trap door in its fully open position. This latch cooperates with a second lug 105 on the trap door assembly 22 to releasably secure the trap door assembly in this open position. The weight of the trap door causes both the trap door and the folding step to swing to their intermediate, neutral positions when released and the remainder of the closing operation is effected by simply pushing down on the trap door, preferably with the foot.

Referring to Fig. 8, the connecting rod 86 is hollow and into its opposite ends are threaded links 86a. One of the links 86a is provided with a right hand thread, whereas the other one is provided with a left hand thread so that as the hollow connecting rod 86 is turned, the effective length of the connecting rod 86 is increased or decreased. In this manner the relative positions between the trap door and the folding step can be adjusted.

Thus there is provided a step and trap door assembly made up of three units, each of which can be separately sub-assembled. The three separate sub-assemblies can then be assembled into the single unit in a shop following mass production methods. This complete unit can then be brought to the site of the car and installed quickly and simply as is apparent from the foregoing description.

I claim:

1. A unitary step and trap door assembly comprising a pair of spaced apart step-well members, a plurality of stationary steps extending between and secured to the step-well members, a closing sheet forming with the steps and the step-well members in effect a box housing, a folding step assembly below the stationary steps and extending between the step-well members, and hinge means enclosed in the box housing and secured to the bottom stationary step pivotally mounting the folding step assembly.

2. A unitary step and trap door assembly comprising a pair of spaced apart step-well members, a plurality of stationary steps extending between and secured to the step-well members, a closing sheet forming with the steps and the step-well members in effect a box housing, a folding step assembly below the stationary steps and extending between the step-well members, hinge means enclosed in the box housing and secured to the bottom stationary step pivotally mounting the folding step assembly, and a trap door pivoted to one of the step-well members and movable from a closed position over the steps to an open position free of the steps.

3. A unitary step and trap door assembly comprising a pair of spaced apart step-well members, a plurality of stationary steps extending between and secured to the step-well members, a closing sheet forming with the steps and the step-well members in effect a box housing, a folding step assembly below the stationary steps and extending between the step-well members, hinge means enclosed in the box housing and secured to the bottom stationary step pivotally mounting the folding step assembly, a trap door pivoted to one of the step-well members and movable from a closed position over the steps to an open position free of the steps, and connecting means disposed at least partially in the box housing operatively connecting the trap door to the folding step assembly so that movement of the trap door between open and closed positions conveys corresponding movement of the folding step assembly between open and closed positions.

4. A unitary step and trap door assembly comprising a pair of spaced apart step-well members, a plurality of stationary steps extending between and secured to the step-well members, a closing sheet forming with the steps and the step-well members in effect a box housing, a folding step assembly below the stationary steps and extending between the step-well members, hinge means enclosed in the box housing and secured to the bottom stationary step pivotally mounting the folding step assembly, a trap door pivoted to one of the step-well members and movable from a closed position over the steps to an open position free of the steps, the box housing being provided with an aperture passing through one of the steps, and connecting means operatively connecting the trap door to the folding step and including a connecting rod extending from the trap door, through the aperture and to a position inside the box housing so that movement of the trap door between open and closed positions conveys corresponding movement of the folding step assembly between open and closed positions.

5. A unitary step and trap door assembly comprising a pair of spaced apart step-well members, a plurality of stationary steps extending between and secured to the step-well members, a closing sheet forming with the steps and the step-well members in effect a box housing, a folding step assembly below the stationary steps and extending between the step-well members, hinge means enclosed in the box housing and secured to the bottom stationary step pivotally mounting the folding step assembly, a trap door pivoted to one of the step-well members and movable from a closed position over the steps to an open position free of the steps, the box housing being provided with an aperture passing through one of the steps and connecting means operatively connecting the trap door to the folding step and including a connecting rod extending from the trap door, through the aperture and to a position inside the box housing so that movement of the trap door between open and closed positions conveys corresponding movement of the folding step assembly between open and closed positions, and a closing member on the connecting means movable to close the aperture when the step and trap door are moved to their opened positions.

6. A unitary step and trap door assembly, for installation between sill members of a vehicle, comprising a stationary step and step well sub-assembly, a movable step sub-assembly, and a trap door sub-assembly, said stationary step and step well sub-assembly comprising a pair of spaced apart well side units, a stationary step unit secured at its ends to said side units and maintaining the same in spaced relationship to provide a structurally independent subassembly, said side units including externally disposed supporting frame members having downwardly facing shoulder portions for engagement with correspondingly disposed upwardly disposed shoulder portions on said sill members, whereby said structurally independent sub-assembly may be mounted between and supported from said sill members, said movable step sub-assembly being disposed below said stationary step unit and extending between said side units, hinge means mounted on said stationary step unit pivotally mounting the movable step sub-assembly to said stationary step and step well sub-assembly, said trap door sub-assembly including a trap door pivotally mounted on one of said side units and movable from a closed position over said stationary step unit and said movable step sub-assembly into an open position in which it is free of said steps, and connecting means extending from said trap door and secured to said movable step sub-assembly so that movement of said trap door between open and closed positions causes movement of said movable step sub-assembly between open and closed position, whereby said movable step sub-assembly and said trap door sub-assembly are supported solely from said structurally independent sub-assembly.

7. A unitary step and trap door assembly as claimed in claim 6 in which said stationary step unit is provided with an apertured tread portion, and in which said connecting means extends through the aperture of said apertured tread portion, in combination with a closing member carried by said connecting means and movable from a position below said tread member when said trap door is closed into a position in which said closing member is substantially flush with said tread member and closes the aperture therein when said trap door is open.

8. A unitary step and trap door assembly as claimed in claim 6 in which said stationary step unit includes a riser depending from the bottom step thereof and in which said movable step sub-assembly includes a second riser projecting upwardly from the uppermost step thereof and adapted to overlie said first-mentioned riser when said movable step sub-assembly is in open position, thereby limiting the open position of said movable step sub-assembly, said hinge means including a hinge bracket mounted on the inner face of said first-mentioned riser, and a complementary hinge bracket mounted on the inner face of said second-mentioned riser and projecting through said first-mentioned riser and cooperating with said first-mentioned hinge bracket, whereby said hinge means are disposed entirely on the inner surface of said first-mentioned riser.

References Cited in the file of this patent

UNITED STATES PATENTS

| Number | Name | Date |
|---|---|---|
| 722,074 | Andrews et al. | Mar. 3, 1903 |
| 1,252,993 | Berry | Jan. 8, 1918 |
| 2,415,341 | Dean | Feb. 4, 1947 |
| 2,522,674 | Heyerdahl | Sept. 19, 1950 |